US006362135B1

(12) United States Patent
Greer

(10) Patent No.: US 6,362,135 B1
(45) Date of Patent: Mar. 26, 2002

(54) CATALYZED COMPOSITIONS AND METHODS FOR USE IN VEHICLE SURFACE ANTI-ICING AND OTHER APPLICATIONS

(75) Inventor: F. Conrad Greer, Coppell, TX (US)

(73) Assignee: Platinum Research Organization, L.L.C., Dallas, TX (US)

( * ) Notice: Subject to any disclaimer, the term of this patent is extended or adjusted under 35 U.S.C. 154(b) by 0 days.

(21) Appl. No.: 09/648,360

(22) Filed: Aug. 25, 2000

Related U.S. Application Data

(60) Division of application No. 09/258,171, filed on Feb. 25, 1999, now Pat. No. 6,258,758, which is a continuation-in-part of application No. 08/639,196, filed on Apr. 26, 1996, now Pat. No. 5,877,128.

(51) Int. Cl.$^7$ .................... C10M 125/00; C10M 141/00
(52) U.S. Cl. .................... 508/113; 508/123; 508/126; 508/181; 148/251; 427/248.1; 427/421; 244/134 C
(58) Field of Search .................. 508/113, 123, 508/126, 181; 148/251; 427/248.1, 421; 244/134 C

(56) References Cited

U.S. PATENT DOCUMENTS

| | | | |
|---|---|---|---|
| 2,230,654 A | 2/1941 | Plunkett ..................... 260/94 |
| 2,510,112 A | 6/1950 | Holbrook ................... 260/29.6 |
| 2,993,567 A | 7/1961 | Schachner ..................... 184/1 |
| 3,194,762 A | 7/1965 | Browning et al. ......... 252/51.5 |
| 3,247,116 A | 4/1966 | Relling ........................ 252/58 |
| 3,314,889 A | 4/1967 | Christian ................... 252/49.6 |
| 3,432,431 A | 3/1969 | Mitacek ........................ 252/16 |
| 3,493,513 A | 2/1970 | Petriello ...................... 252/58 |
| 3,505,229 A | 4/1970 | Skehan ......................... 252/54 |
| 3,536,624 A | 10/1970 | Christian et al. ............. 252/54 |
| 3,567,521 A | 3/1971 | Toy et al. .................... 148/6.3 |
| 3,592,700 A | 7/1971 | Toy ............................ 148/6.3 |
| 3,607,747 A | 9/1971 | Ishikawa ...................... 252/18 |
| 3,636,172 A | 1/1972 | Gardner .................... 260/635.5 |
| 3,640,859 A | 2/1972 | Messina et al. ............... 252/54 |
| 3,723,317 A | 3/1973 | Ulery .................... 252/51.5 R |
| 3,806,455 A | 4/1974 | Siegart et al. .............. 252/46.7 |
| 3,909,431 A | 9/1975 | Figiel .......................... 252/54 |
| 3,933,656 A | 1/1976 | Reick .......................... 252/25 |
| 3,969,233 A | 7/1976 | Lucas .......................... 252/22 |
| 4,029,870 A | 6/1977 | Brown et al. ................ 526/255 |
| 4,036,718 A | 7/1977 | Brown et al. ............ 204/159.2 |
| 4,052,323 A | 10/1977 | Feneberger et al. ........... 252/23 |
| 4,127,491 A | 11/1978 | Reick .......................... 252/16 |
| 4,224,173 A | 9/1980 | Reick ........................ 252/52 A |
| 4,252,678 A | 2/1981 | Smith ......................... 252/430 |
| 4,349,444 A | 9/1982 | Reick .......................... 252/16 |
| 4,363,737 A | 12/1982 | Rodriguez ................... 252/26 |
| 4,405,469 A | 9/1983 | Hafner ........................ 252/28 |
| 4,465,607 A | 8/1984 | Cottell ........................ 252/58 |
| 4,484,954 A | 11/1984 | Tarancon .................... 148/6.3 |
| 4,500,678 A | 2/1985 | Kita et al. ..................... 252/58 |
| 4,584,116 A | 4/1986 | Hermant et al. .............. 252/51 |
| 4,615,917 A | 10/1986 | Runge ..................... 427/385.5 |
| 4,657,687 A | 4/1987 | Caporiccio et al. ........... 252/54 |
| 4,770,797 A | 9/1988 | Syracuse et al. .............. 252/12 |
| 4,803,005 A | 2/1989 | Juhlke et al. ................. 252/58 |
| 4,834,894 A | 5/1989 | Scheld ...................... 252/49.9 |
| 4,857,492 A | 8/1989 | Bradley et al. ............. 502/117 |
| 4,859,357 A | 8/1989 | Germanaud et al. .......... 252/51 |
| 4,888,122 A | 12/1989 | McCready ................... 252/25 |
| 4,892,669 A | 1/1990 | Marcora et al. .............. 252/30 |
| 5,009,963 A | 4/1991 | Ohmi et al. ............. 428/472.2 |
| 5,096,145 A | 3/1992 | Phillips et al. .............. 244/134 |
| 5,110,657 A | 5/1992 | Ainslie ....................... 428/141 |
| 5,116,900 A | 5/1992 | Flautt et al. ................. 524/377 |
| 5,118,434 A | 6/1992 | Meyer et al. ................. 252/70 |
| 5,160,646 A | 11/1992 | Scheld ...................... 252/32.5 |
| 5,227,081 A | 7/1993 | Sawa et al. ................... 252/28 |

(List continued on next page.)

OTHER PUBLICATIONS

PCT International Search Report dated Jun. 6, 2000.

L. L. Cao, Y. M. Sun, and L. Q. Zheng, Chemical Structure Characterization of Boundary Lubrication Film Using X–ray.

Harold Shaub, John Pandosh, Anne Searle, and Stan Sprague, "Mechanism Studies with Special Boundary Lubricant Chemistry," Society of Automotive Engineers, Paper 952475, 1995, pp. 99–123.

Hal Shaub, John Pandosh, Anne Searle, Stan Sprague, and Martin Treuhaft, "Engine Durability, Emissions and Fuel Economy Studies with Special Boundary Lubircant Chemistry," Society of Automotive Engineers, Paper 941983, 1994, pp. 89–112.

Keith Perrin, John Pandosh, Anne Searle, Hal Shaub, and Stan Sprague, Radioactive Tracer Study of Start–Up Wear Versus Steady–.

Kirk–Othmer, "Concise Encyclopedia of Chemical Technology," John Wiley & Sons, Inc., 1985, pp. 37 and 292–297.

Jacqueline I. Kroschwitz, "Concise Encyclopedia of Polymer Science and Engineering," John Wiley & Sons, Inc., 1990, pp. 31–35 and.

R. E. Banks, B. E. Smart, and J. C. Tatlow, "Organofluorine Chemistry, Principles and Commercial Applications," Plenum Press, 1994, pp. 397–401.

*Primary Examiner*—Jacqueline V. Howard
(74) *Attorney, Agent, or Firm*—Fulbright & Jaworski L.L.P.

(57) ABSTRACT

This invention discloses novel catalyzed surface composition altering formulations and methods and catalyzed surface coating formulations and methods, which contain one or more catalysts, along with optional other ingredients, wherein the catalysts serve to effect in situ chemical bonding reactions in that the catalysts function to initiate, to promote, to accelerate, and/or to increase the formation and yield of persistent, solid, corrosion-resistant, impact-resistant, wear-resistant, and/or non-stick surface compositions and surface coating films, which may exhibit pigmentation and other aesthetic features, and may be designed to be environmentally benign. The disclosed formulation and methods may be used to alter the surface composition and to coat the surfaces of vehicles, such as aircraft, and to improve the anti-icing characteristics of the vehicle surfaces.

74 Claims, No Drawings

OTHER PUBLICATIONS

| | | | |
|---|---|---|---|
| 5,350,727 A | 9/1994 | Tsurumi et al. | 502/325 |
| 5,373,986 A | 12/1994 | Rafferty et al. | 228/206 |
| 5,380,557 A | 1/1995 | Spiro | 427/249 |
| 5,447,896 A | 9/1995 | Rao | 502/184 |
| 5,460,661 A | 10/1995 | Maynard, Jr. | 148/251 |

CATALYZED COMPOSITIONS AND METHODS FOR USE IN VEHICLE SURFACE ANTI-ICING AND OTHER APPLICATIONS

This application is a divisional of U.S. patent application Ser. No. 09/258,171, filed Feb. 25, 1999, now U.S. Pat. No. 6,258,758 entitled CATALYZED SURFACE COMPOSITION ALTERING AND SURFACE COATING FORMULATIONS AND METHODS, which is a continuation-in-part of U.S. patent Ser. No. 08/639,196, filed Apr. 26, 1996, now U.S. Pat. No. 5,877,128, entitled CATALYZED LUBRICANT ADDITIVES AND CATALYZED LUBRICANT SYSTEMS DESIGNED TO ACCELERATE THE LUBRICANT BONDING REACTION, issued Mar. 2, 1999.

TECHNICAL FIELD

This invention relates generally to compositions and methods for catalytically chemically altering the surface composition of, and for bonding a material to, a surface on a vehicle, such as an aircraft, and, more particularly, to compositions and methods for providing a multilayered, persistent, solid, and corrosion- and wear-resistant vehicle surface that possesses anti-icing characteristics.

BACKGROUND

As described in U.S. Pat. No. 5,877,128, entitled, CATALYZED LUBRICANT ADDITIVES AND CATALYZED LUBRICANT SYSTEMS DESIGNED TO ACCELERATE THE LUBRICANT BONDING REACTION, which application is incorporated herein by reference, the present state of the arts are defined and illustrated by many disclosures with respect to the composition, formulation, and performance of lubricant additives, lubricant systems containing solid lubricant additives, the composition and formulation of metal coatings, the composition and formulation of catalysts, and the chemistry and performance of lubricants containing solid lubricant additives, all of which bear some relevance to the invention presented herein. Those disclosures employed as references in this patent application are listed hereinafter.

The references, other than United States Patents, are presented as follows:

L. L. Cao, Y. M. Sun, and L. Q. Zheng, "Chemical Structure Characterization of Boundary Lubrication Film Using X-ray Photoelectron Spectroscopy and Scanning Auger Microprobe Techniques," Wear, 140 (1990), pp. 345–357;

Harold Shaub, John Pandosh, Anne Searle, and Stan Sprague, "Mechanism Studies with Special Boundary Lubricant Chemistry," Society of Automotive Engineers, Paper 952475, 1995;

Hal Shaub, John Pandosh, Anne Searle, Stan Sprague, and Martin Treuhaft, "Engine Durability, Emissions and Fuel Economy Studies with Special Boundary Lubricant Chemistry," Society of Automotive Engineers, Paper 941983, 1994;

Keith Perrin, John Pandosh, Anne Searle, Hal Shaub, and Stan Sprague, "Radioactive Tracer Study of Start-Up Wear Versus Steady-State Wear in a 2.3 Liter Engine," Society of Automotive Engineers, Paper 952474, 1995.

Other useful references are as follows:

Kirk-Othmer, "Concise Encyclopedia of Chemical Technology," John Wiley & Sons, Inc., 1985, pp. 37 and 292–297;

Jacqueline I. Kroschwitz, "Concise Encyclopedia of Polymer-Science and Engineering," John Wiley & Sons, Inc., 1990, pp. 31–35 and 156–171;

R. E. Banks, B. E. Smart, and J. C. Tatlow, "Organofluorine Chemistry, Principles and Commercial Applications," Plenum Press, 1994, pp. 397–401.

The United States Patent Application and the United States Patents which bear particular relevance or are of significant interest with respect to the present patent application are singled out and are cited. See U.S. Pat. Nos. 2,230,654; 2,510,112; 2,993,567; 3,194,762; 3,247,116; 3,314,889; 3,432,431; 3,493,513; 3,505,229; 3,536,624; 3,567,521; 3,592,700; 3,607,747; 3,636,172; 3,640,859; 3,723,317; 3,806,455; 3,909,431; 3,933,656; 3,969,233; 4,029,870; 4,036,718; 4,052,323; 4,127,491; 4,224,173; 4,252,678; 4,349,444; 4,363,737; 4,405,469; 4,465,607; 4,484,954; 4,500,678; 4,584,116; 4,615,917; 4,657,687; 4,770,797; 4,803,005; 4,834,894; 4,857,492; 4,859,357; 4,888,122; 4,892,669; 5,009,963; 5,160,646; 5,227,081; 5,350,727; 5,373,986; 5,447,896; 5,460,661. All of the above references are incorporated herein by reference.

As described in detail in U.S. Pat. No. 5,877,128, it generally has been established, through preexisting research work performed by others, that certain materials, such as Teflon® and polytetrafluoroethylene ("PTFE"), which are different designations for the same chemical composition, can be caused to chemically bond to a surface, such as a metallic surface, when exposed at elevated temperatures.

U.S. Pat. No. 5,877,128 teaches that these materials, such as PTFE, can be caused to chemically bond to a surface, such as a metallic surface, at relatively low (e.g., ambient) temperatures and atmospheric pressures, when the reactants are appropriately catalyzed. In a preferred embodiment, the catalysts disclosed comprise a transition metal such as platinum or palladium. U.S. Pat. No. 5,877,128 further discloses such applications as lubricating load-bearing wear surfaces, and non load-bearing applications and applications where "non-stick" properties are being sought, for example cookware surfaces, cling, and stain resistant surfaces, etc.

SUMMARY OF THE INVENTION

The concepts of the invention disclosed in U.S. Pat. No. 5,877,128 were initially generally thought to be most advantageous when used primarily for applications utilizing the lubrication characteristics of the surface coating. However, some of the catalysts claimed, such as platinum and palladium, may be too expensive for some applications. In addition, further investigation has led to the conclusion that the same basic concepts are capable of causing surface coating films of PTFE, fluorine containing species, or other unreacted surface coating materials to be chemically bonded to the surface to be coated for applications utilizing other characteristics of the surface coating. For example, the present invention may provide a multilayered, persistent, solid, and corrosion and wear resistant surface coating on the skin (e.g., body panels) of a vehicle, such as an aircraft, not only to provide lubricated surfaces that would be expected to substantially reduce the drag coefficients of the aircraft, but also that could be designed to provide enduring, environmentally benign aircraft anti-icing capabilities, along with a large number of other beneficial properties. As used herein, "unreacted surface coating materials" are defined as including an individual material or combination of materials which may be employed to undergo a catalytically aided reaction wherein the materials are caused to chemically bond to a surface, and in particular refers to such materials prior to the catalytically aided chemical bonding reaction.

Prior art conventional surface coatings are available primarily as liquids or fusible compositions. Generally, the currently available surface coatings are categorized into two different classes.

The first class includes surface coating systems containing oil-modified alkyds, volatile organic compounds (VOCs), or other polymers containing drying oils, which coatings may be divided into the following subclasses:

(1) architectural surface coatings which require air drying applications to cause curing and adhesion, such as oxidizing alkyd resins;

(2) metal surface coatings which require air-drying or low temperature bake-on applications to cause curing and adhesion, such as alkyd and phenoplast, or nitrocellulose, chlorinated rubber, polystyrene, diisocyanate, or vinyl and epoxy;

(3) premium surface coatings with good color retention, and superior chemical and heat resistance which require air-drying or low temperature bake-on applications to cause curing and adhesion, such as alkyd and aminoplast, or aminoplast and epoxy, or alkyd and silicone; and (4) surface coatings for use as undercoating or overcoating enamels which require bake-on applications to cause curing and adhesion, such as oil-modified epoxy resins and aminoplast.

The second class includes surface coating systems containing no alkyds or drying oils, which coatings may be divided into the following subclasses:

(1) surface coatings with good chemical resistance which require bake-on applications to cause curing and adhesion, such as vinyl acetals and/or phenolic, allylaminoplast, epoxy, along with 2,4,6-trimethylophenyl ether;

(2) surface coatings primarily for corrosion protection which require only ambient temperature applications to cause curing and adhesion, such as phenoplasts with or without epoxy, vinylacetal or aminoplast;

(3) surface coatings that exhibit chemical and discoloration resistance and exhibit high gloss or clear finishes which require elevated temperatures to cause curing and adhesion, such as polyester and triazine resin, allyl polyester, silicone, thermosetting acrylics, complex amino resins, and other polyesters;

(4) surface coatings for architectural products which require heat or air drying applications to cause curing and adhesion, such as vinyl acetate-chloride, copolymers vinylidiene or vinyl chloride-acrylonitrile copolymers, butadiene copolymers, acrylic copolymers, and polyvinyl acetate; and (5) surface coatings for electric potting and insulation, as well as corrosion protection which require elevated temperature applications to cause curing and adhesion, such as nylons, cellulose ester and ethers, polyurethane, polytetrafluoroethylene, polyvinyl acetate, saturated polyesters, unsaturated polyesters and styrene, epoxy and polyamide, and copolymers of ethylene or propylene.

Prior art surface coating systems such as those listed above, are generally mixtures of the stated ingredients in aqueous or organic carrier fluids. In most instances, the coatings are applied to the surfaces to be coated wherein they are allowed to flow over such surfaces forming relatively thin, smooth surface coating films, aided principally by the surface tension forces of the viscous surface coating mixtures. Most surface coating mixtures are comprised of organic and/or inorganic unreacted coating materials, pigments, binders, and carrier fluids, along with other ingredients.

Binders are grouped into certain overlapping classes such as acrylics, vinyls, alkyds, polyesters, and others. The molecular structure of the binders and the forces operating between the molecules largely determine the mechanical properties of the surface coatings. The binders exist in the final surface coating, usually as a polymer of high molecular weight that may or may not be cross-linked. Binders are primarily responsible for the plastic quality of the surface coating.

Prior art surface coating systems are generally designed to be applied as liquids, preferably liquids exhibiting low viscosities, both to wet the surface to be coated, and to facilitate flow into the crevices and asperities which are universally found in solid surfaces. Generally, the necessary adhesive properties are activated in the conventional surface coating system by heating the system to the point where simple flow occurs, by dissolving or dispersing the material in a solvent, or by starting with a composition of liquid monomers or oligomers that polymerize or react after application. Eventually the adhesion producing elements of the conventional surface coating systems must undergo a phase change which is commonly referred to as "drying" and/or "curing," which phase change is promoted by cooling, heating, solvent evaporation, or interaction with the surfaces to be coated. Ultimately, adhesion takes place as the surface coating systems congeal, cure, and pass from the liquid phase to the solid phase.

Prior art surface coatings generally rely upon the adhesive properties of the surface coating systems and the cleanliness and texture of the surface to be coated to provide adherence of the surface coatings to the coated surfaces. Adhesion is an interfacial phenomenon which involves surface wetting, but the remainder of the phenomenon definition appears to be uncertain. This uncertainty has given rise to several theories concerning the issue.

First, the electrical theory presumes that the adhesiveness of the surface coating systems and the surfaces to be coated are like two plates of a capacitor that becomes charged due to the proximity of the two substances. However, this theory fails to predict the bond that results when a layer of water is frozen and serves to join two blocks of ice, or when an epoxy adhesive is used to join two previously cured blocks of cast epoxy.

Second, the diffusion theory presumes the penetration of the surface to be coated by the surface coating system prior to its solidification. This theory is easily applied to many porous plastics; however, it does not appear applicable to metal, glass, glazed ceramics, etc.

Third, the adsorption theory specifies the concept of forces, such as van der Waals forces, acting across the space between molecules within surface coating system and the surface to be coated.

Fourth, the rheological theory suggests that the removal of weak boundary layers of surface materials such as plastics leaves the mechanical properties of the bond between the surface coating systems and the coated surfaces to be determined by the material composition within the bond region and the local stresses.

The invention set forth herein discloses novel catalyzed surface coating compositions and methods. Compositions include both catalyzed surface coating additives and catalyzed surface coating systems which contain one or more catalysts along with optional other ingredients. Unlike conventional surface coating systems and theories, the catalyzed surface coating compositions of this invention are capable of bonding to the surfaces to be coated by virtue of novel processes involving catalyzed chemical bonding reactions between such compositions and the surface to be coated, without the need for air drying, baling, evaporation of solvents and volatile organic compounds (VOCs), polymerization, phase change or other conventional means of curing, surface roughening, or surface alteration in order to effect adhesion. The chemical bonding of the surface coating is generally accomplished by chemical reactions which are initiated, promoted, accelerated, and/or made to produce greater yields as a consequence of the inclusion of one or more effective catalysts. By this process, for example, the hazards of VOCs and other unwanted surface coating byproducts are eliminated.

The catalyzed compositions of this invention generally consist of colloidal suspensions of very finely divided particles of unreacted surface coating materials (e.g., PTFE) in dispersant fortified carrier fluids (e.g., an aqueous or oil based carrier fluid), along with one or more effective catalysts, and optionally with other ingredients. These compositions may be formulated of ingredients which render them environmentally benign. These compositions may be designed to be applied to a surface to be coated at ambient temperature and atmospheric pressure. Alternatively, the catalyzed chemical bonding reaction may be promoted by increasing temperature and/or pressure. The results are expected to be multi-molecular layers of reaction products derived from PTFE, fluorine containing species, or the reaction products derived from other unreacted surface coating materials after being chemically bonded to the coated surface, although a single-molecular layer of reaction products may also be formed on the coated surface. As used herein, a "carrier fluid" is defined as including an individual fluid or combinations of fluids which may be employed to transport, suspend, distribute, disperse, propel, and/or generally surround and contain the other ingredients of this invention until such ingredients are delivered to the surface to be coated. The carrier fluid may be a lubricant, such as oil or water. In addition, the carrier fluid may be nonvolatile, requiring removal from the coated surface after application, or volatile, carrying the other ingredients to the surface but not remaining on the surface itself It is presently known that PTFE, as well as many fluorine containing species by themselves, are both benign and constitute non-stick surfaces that resist the adherence of most other substances. In addition, PTFE, along with various fluorine containing species, present surfaces that are somewhat impact resistant, resist erosion, and exhibit some of the lowest coefficients of friction of any known solid materials. Once the above described catalyzed chemical reactions take place on surfaces, the favorable characteristics of the reaction products, such as those reaction products derived from PTFE and/or various fluorine containing species, are expected to be imparted to the coated surfaces.

The beneficial properties generally expected to be imparted to the coated surface by the catalyzed chemical reactions of this invention include one or more of the following:

(1) increased wear resistance, for example the chemically bonded surface coating (e.g., PTFE) may prevent contact between the underlying surface and another surface or material, hence obviating or diminishing wear;

(2) increased non-stick properties, for example the chemically bonded surface coating (e.g., PTFE) may alter the characteristics of the exposed surface such that ice does not bond, hence providing anti-icing protection;

(3) increased dirt and stain resistance, for example the chemically bonded surface coating (e.g., PTFE), which may be applied to any surface including fabrics such as nylon, polyester, fiberglass, and other man-made and natural fibers, may provide a non-stick outer layer to which dirt and stain will not adhere or penetrate (e.g., for articles of clothing or other articles of manufacture);

(4) reduced coefficients of friction, for example the chemically bonded surface coating (e.g., PTFE) may alter the characteristics of the exposed surface such that the surface assumes the coefficient of friction of the coating material, hence reducing the drag coefficient under direct moving contact, such as those conditions which exist during turbulent flow conditions (e.g., for an aircraft or rocket passing through air, or a ship, submarine or torpedo passing through water);

(5) increased corrosion protection, for example the chemically bonded surface coating (e.g., PTFE) may provide an inert, impermeable outer layer which most corrosive agents cannot penetrate or alter (e.g., for oxidation resistance for structures such as buildings, bridges or near/offshore oil rigs, which are exposed to corrosive external elements such as acid rain or salt water, or for vessels containing corrosive agents);

(6) reduced surface erosion, for example the chemically bonded surface coating (e.g., PTFE) may provide both lubricity and impact resistance which properties serve to obviate or minimize erosion;

(7) improved impact resistance, for example the chemically bonded surface coating (e.g., PTFE) may provide a degree of resilience that may cushion impact better than would the surface prior to being coated;

(8) altered electrical conductivity, for example the chemically bonded surface coating (e.g., PTFE) may impart its electrical characteristics to the surface and in so doing may increase or decrease the electrical conductivity of the coated surface;

(9) altered dielectric constants, for example the chemically bonded surface coating (e.g., PTFE) may impart its electrical characteristics to the surface and in so doing may increase or decrease the effective dielectric constants of the coated surface;

(10) increased radar stealth characteristics, for example the chemically bonded surface coating (e.g., PTFE) may provide reduced reflectance of microwave energy when compared to the uncoated surface (e.g., for military vehicles such as aircraft, rockets or ships);

(11) reduced permeability, for example the chemically bonded surface coating (e.g., PTFE) may provide an impermeable outer layer that excludes the passage of virtually all materials including gases under very high pressures;

(12) increased water proofing, for example the chemically bonded surface coating (e.g., PTFE) may provide an impermeable outer layer which will exclude the passage of water (e.g., for articles of clothing, recreational equipment, or other articles of manufacture);

(13) improved pressure seal, for example the chemically bonded surface coating (e.g., PTFE) may provide an impermeable outer layer which when compressed will deform to some degree and will block fluid passage (e.g., for threads on fluid carrying tubular goods such as pipes or tubes, or for closely fitted metal-to-metal sealing elements like pistons, pneumatic and hydraulic rams);

(14) altered optical properties, for example the chemically bonded surface coating (e.g., PTFE) may provide an outer layer that will, in most cases, change the characteristics of the light reflected off of such surface;

(15) reduced osmosis of gases, for example the chemically bonded inner surface coating (e.g., PTFE) provides a layer that will, in most cases, reduce the ability of gases to osmose through the walls of the pressure vessel or container in which such gases may be stored;

(16) altered surface pigmentation, for example the chemically bonded surface coating material (e.g., PTFE) may include any number of pigments which may serve to add colors, designs, patterns, graphics, etc., to the coated surfaces;

(17) altered surface aesthetic, for example, the chemically bonded surface coating material (e.g., PTFE) may include any number of aesthetic enhancing features such as metal flakes, crystals, oyster shells, pearlescent materials, reflective materials, etc.;

(18) reduced surface energy, for example the chemically bonded surface coating (e.g., PTFE) may provide an outer layer that will tend to exhibit less surface energy than most surfaces to which such coatings may be applied; and

(19) reduced refractive index, for example the chemically bonded surface coating (e.g., PTFE) may provide an outer layer that will tend to reduce the refractive index of most surfaces to which such coating may be applied.

As a further example, the second property listed above, increased non-stick, may be very beneficial to the airline industry. The prior art use of glycols as aircraft deicers has been found to be objectionable because the surplus glycol materials sprayed on the aircraft during deicing operations tend to find their way into the atmosphere, into the soils, and/or into the storm drain systems, all of which events violate the U.S. Federal Clean Air Act and/or the U.S. Federal Clean Water Act. Ethylene glycol is deemed to be toxic by the U.S. Environmental Protection Agency ("EPA") and is no longer procured by the U.S. Air Force for deicing. Propylene glycol based deicing compounds are less toxic and therefore have been regarded as being more favorable than ethylene glycol; however, such compounds have a significant adverse environmental impact as toxic colloidal dispersions in the atmosphere and as runoff in soils, and in surface and ground waters due to the high biological oxygen demand occasioned by propylene glycol degradation.

In addition, spraying and coating aircraft with various glycol products create a very temporary deicing/anti-icing protective condition that is time dependent, and may be totally ineffective if the aircraft is not launched before the protective coating dissipates. In any event, the degree of protection from this method of deicing is very transitory, with no adequate means of monitoring the duration of its short-lived effective period.

Accordingly, there is a significant need in the prior art for improved anti-icing technology that will exhibit improved longer lasting protection, and which may be designed to not have a negative environmental impact. If such improved anti-icing technology proves to be sufficiently successful, it may obviate the need for deicing in the manner in which it is presently practiced. Moreover, in the event the anti-icing technology imparts certain lubrication qualities, along with a host of other benefits, the merits of such technology may be all the more important.

The anti-icing properties associated with the chemically bonded PTFE and/or other fluorine containing species reaction products are not generally expected to significantly alter the propensity of ice to form on the coated aircraft surfaces, and therefore are not expected to directly contribute as a significant deicing mechanism. However, the aircraft surfaces, coated in accordance with the present invention, are expected to resist the adherence of ice on such coated surfaces. Therefore, if ice forms on the coated aircraft surfaces, it is expected that such ice may be quite simply removed by the stream of turbine engine gases when directed over the wing, fuselage, and other aircraft surfaces through the use of specially designed thrust reversers, by some mechanical displacement means, by a concentrated high pressure focused stream of other fluids (e.g., water), and/or various other means, at least when the aircraft is on the ground. In addition, it is expected that any ice formed on the aircraft non-stick coated surfaces while in flight automatically may be displaced by the inherent ever-present air turbulence continuously impacting the aircraft surfaces. Additionally, an anti-icing coating may be useful on other vehicles besides aircraft, such as ships (including boats), military vehicles, trains, automobiles (including trucks), etc.

Surface coatings are generally applied for the purpose of imparting to the coated surfaces one or more of the many beneficial properties cited above. In this regard, the coating capabilities inherent in this invention may ultimately prove to have advantages, not otherwise available from the state of the art conventional coating formulations and/or methods, with respect to any and all of those surfaces which are presently coated by conventional formulations and methods.

For example, organic halogen polymers, such as PTFE, would be expected to offer several advantages as surface coatings because it is expected that such polymers would impart their special properties to the surface to be coated. However, because of the poor solubility of organic halogen polymers in organic solvents and the need for elevated temperatures to cause the curing and adhesion of such polymers to the coated surface, such coatings and coating methods find very limited applications in the prior art. Furthermore, the relatively high temperatures required for curing and adhesion of the organic halogen polymers, which temperatures may be as high as 380° C., frequently cause the formation of pinholes in the final surface coatings. As a consequence, such organic halogen polymer surface coatings may not be favorably recommended as anti-corrosive coatings in the prior art, despite their inherent excellent chemical resistance.

By way of contrast, the surface coating formulations and methods of the present invention are expected to provide the means by which coatings of organic halogen polymers and other unreacted surface coating materials may be bonded to the coated surface by virtue of a catalytically aided chemical bonding reaction between the unreacted surface coating materials and the surface to be coated generally at or near ambient temperatures and pressures.

In addition to the aircraft surface coating applications set forth above, the surface coatings of this invention are expected to prove advantageous in the coating of any and all objects composed of solid or semisolid materials, including any and all surfaces which are presently coated by conventional coating formulations and methods. For example, the anti-corrosive properties of a chemically bonded surface coating would be very useful for protecting man-made structures, such as buildings, bridges, water or other towers, etc., that are exposed to the elements.

Catalyzed Surface Coating Additives

The present invention consists of novel concepts, including the concept of causing unreacted surface coating materials to become chemically bonded to surfaces as a consequence of catalytically aided chemical bonding reactions. In addition, this present invention provides the basis for a group of formulations for catalyzed surface coating additives, and for catalyzed surface coating systems. The catalyzed surface coating additives may comprise ingredients shown below as Items 1, 2, 3, and 4, and optionally any number of the remaining ingredients shown below as Items numbered 5 through 11.

Catalyzed Surface Coating Additive Ingredients

The ingredients of the catalyzed surface coating additives are as follows:

1. one or more carrier fluids,
2. one or more dispersants,
3. one or more catalysts,
4. one or more unreacted surface coating materials as ingredients wherein such ingredients may include pigmentation and other aesthetic features, and wherein one or more of the ingredients are selected from the unreacted surface coating materials group consisting of Teflon®, PTFE, polytetrafluoroethylene, perfluoropolyether, polyvinylidene fluoride, perfluoropolyether oxide, ethylene polymers, propylene polymers, fluorophenylene polymers, other polymers, other fluorinated inorganic and organic compounds, other fluorine containing species, plastics, ethers, amides of fatty acids, other monoesters of fatty acids, fatty acid compounds, metallic soaps, polyol molybdenum compounds, graphite, carbon halogens, barium fluoride, calcium fluoride, lithium fluoride, sulfurized fats, and esters,
5. any number of catalysts, wherein such catalysts are transition elements, and/or one or more compounds, in which one or more transition elements are included, and/or any combination of transition elements and compounds in which transition elements are included, wherein the transition elements are identified as those elements bearing atomic numbers 21 through 31, 39 through 49, and 71 through 81, all inclusive,
6. any number of catalysts, wherein such catalysts are non-transition elements, and/or one or more compounds in which one or more non-transition elements are included, and/or any combination of non-transition elements, and compounds of non-transition elements,
7. any number of catalysts wherein such catalysts are any combination of transition elements, non-transition elements, compounds in which transition elements are included, and/or compounds in which non-transition elements are included,
8. any number of catalysts, where such catalysts are homogeneous, heterogeneous, or any combination of homogeneous and heterogeneous catalysts,
9. any number of halogen elements, and/or any number of compounds in which halogen elements are included, and/or any combination of halogen elements and/or compounds in which halogen elements are included,
10. any number of detergents, and
11. any number of freezing point and/or boiling point altering agents.

Catalyzed Surface Coating Systems

The catalyzed surface coating systems of this invention comprise one or more of the catalyzed surface coating additives of this invention admixed with one or more carrier fluids, along with any number of other ingredients.

It is anticipated that the catalyzed surface coating systems of this invention shall be delivered to the surface to be coated by a number of different conventional methods well known to those skilled in the art, such as spray coating, immersion, brushing, wiping, mechanical transference, etc., and all such delivery methods are intended to be within the scope of the present invention.

It is a technical advantage of at least one preferred embodiment of the present invention to establish one or more novel catalyzed surface coating additives and catalyzed surface coating system formulations designed to impart one or more of the previously cited beneficial properties to the surfaces coated with such surface coatings.

It is a technical advantage of at least one preferred embodiment of the present invention to establish one or more novel catalyzed surface coating additives, specifically including one or more carrier fluids, dispersants, catalysts, unreacted surface coating materials, and any number of other ingredients.

It is a technical advantage of at least one preferred embodiment of the present invention to establish one or more novel catalyzed surface coating additives which shall include one or more carrier fluids, dispersants, catalysts, unreacted surface coating materials, and any number of halogen sources, detergents, freezing point and/or boiling point altering agents, and any number of other ingredients.

It is a technical advantage of at least one preferred embodiment of the present invention to establish one or more novel catalyzed surface coating additives wherein the ingredients, in addition to one or more of the dispersants, catalysts, and unreacted surface coating materials, include water as a carrier fluid.

It is a technical advantage of at least one preferred embodiment of the present invention to establish one or more novel catalyzed surface coating additives wherein the ingredients, in addition to one or more carrier fluids, dispersants, and unreacted surface coating materials, include one or more catalysts from the group, including but not limited to, one or more transition elements, and/or one or more compounds in which transition elements are included, and/or any combination of transition elements and transition element compounds, where the transition elements are identified as those elements bearing atomic numbers 21 through 31, 39 through 49, and 71 through 81, all inclusive.

It is a technical advantage of at least one preferred embodiment of the present invention to establish one or more novel catalyzed surface coating additives wherein the ingredients, in addition to one or more carrier fluids, dispersants, and unreacted surface coating materials, include one or more catalysts from the group, including but not limited to, one or more non-transition elements, and/or one or more compounds in which non-transition elements are included, and/or any combination of non-transition elements and non-transition element compounds.

It is a technical advantage of at least one preferred embodiment of the present invention to establish one or more novel catalyzed surface coating additives wherein the ingredients, in addition to one or more carrier fluids, dispersants, and unreacted surface coating materials, include one or more catalysts in concentrations required to initiate, to promote, to accelerate, and/or to increase the yield of reaction products and function effectively in the surface coating in situ catalyzed bonding reaction.

It is a technical advantage of at least one preferred embodiment of the present invention to establish one or more novel catalyzed surface coating additives wherein the ingredients, in addition to one or more of the carrier fluids, dispersants, catalysts, and unreacted surface coating materials, include a halogen source comprised of one or more halogen elements and/or compounds in which halogen elements are included, to function as starters and to contribute to the mass effect of the catalyzed surface coating reactions.

It is a technical advantage of at least one preferred embodiment of the present invention to establish one or more novel catalyzed surface coating additives wherein the ingredients, in addition to one or more of the carrier fluids, dispersants, catalysts, and unreacted surface coating materials, include detergents to facilitate better chemical interaction with the surface to be coated.

It is a technical advantage of at least one preferred embodiment of the present invention to establish one or more novel catalyzed surface coating additives wherein the ingredients, in addition to one or more of the carrier fluids, dispersants, catalysts, and unreacted surface coating materials, include freezing point and/or boiling point altering agents to broaden the ambient temperature conditions under which the catalyzed surface coating additives can be applied effectively.

It is a technical advantage of at least one preferred embodiment of the present invention to establish one or more novel catalyzed surface coating additives wherein the ingredients, in addition to one or more of the carrier fluids, dispersants, catalysts, and unreacted surface coating materials, include any number of other ingredients.

It is a technical advantage of at least one preferred embodiment of the present invention to establish one or more novel catalyzed surface coating systems comprised of one or more catalyzed surface coating additives and one or more carrier fluids.

It is a technical advantage of at least one preferred embodiment of the present invention to establish one or more novel methods to provide catalytically aided bonded surface coatings wherein catalyzed surface coating systems are applied to the surfaces to be coated, and the contact between said catalyzed surface coating systems and said surfaces results in catalytically aided chemical bonding reactions, which reactions, when completed, provide said surfaces with chemically bonded surface coatings.

It is a technical advantage of at least one preferred embodiment of the present invention to establish one or more novel methods to provide catalytically aided bonded surface coatings wherein catalyzed surface coating systems are applied to the surfaces to be coated, and the contact between said catalyzed surface coating systems and said surfaces results in catalytically aided chemical bonding reactions, which reactions, when completed, provide said surfaces with chemically bonded surface coatings, all of which reactions go to completion under naturally occurring ambient temperature and pressure conditions.

It is a technical advantage of at least one preferred embodiment of the present invention to establish one or more novel methods for applying surface coatings with the catalyzed surface coating systems of this invention.

It is a technical advantage of at least one preferred embodiment of the present invention to establish one or more novel methods to provide catalytically aided bonded surface coatings wherein such surface coating methods are applied to the surfaces to be coated, after the surfaces have been cleaned and are free of other coatings and/or any materials extraneous to the catalyzed surface coating reaction.

It is a technical advantage of at least one preferred embodiment of the present invention to impart one or more beneficial properties to the surfaces coated by the novel methods of this invention.

It is a technical advantage of at least one preferred embodiment of the present invention to establish a novel method of deicing aircraft by focusing the turbine intra-stage gases and/or the turbine exhaust gases of the aircraft engine and/or engines and/or of an auxiliary power unit (APU) on the ice-bearing aircraft surfaces to remove said ice through physical displacement and/or melting of said ice by said gases, prior to flight.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

After the filing of U.S. Pat. No. 5,877,128, a number of tests have been conducted on a representative selection of catalyst candidates. More specifically, the catalyst candidates were admixed with a colloidal suspension of PTFE wherein the PTFE was in the form of particles, ranging in diameter from 2 microns down to submicron size, all suspended in a hydrocarbon mineral oil base (motor oil) treated with dispersants. This mixture was then admixed with graphite fluoride and halocarbon oil. The final composition of the mixture was as shown in Table 1 below:

TABLE 1

Catalytic Lubricant System

| Ingredients | Weight % |
| --- | --- |
| Lubricant Base (motor oil) | 92.0 |
| Dispersant | 1.2 |
| PTFE | 0.8 |
| Graphite Fluoride | 2.0 |
| Halocarbon Oil | 2.0 |
| Catalyst | 2.0 |
| Total | 100.0 |

Iron coupons with a radius of approximately one centimeter were cleaned and immersed in the above defined colloidal suspension for a period of eight hours at temperatures ranging from 50° C. to 200° C. and at atmospheric pressure. Following this immersion, the coupons were thoroughly rinsed to remove any unbonded solid PTFE material. The surfaces were then analyzed using X-ray Photoemission Spectroscopy (XPS) methods to detect carbon, fluorine, oxygen, and iron. The primary indicator used to determine the concentration of bonded PTFE and/or "fluorine containing species" on the iron surfaces was the intensity of the fluorine photoemission peaks, as displayed by the XPS equipment. It is believed that in the present catalytically aided chemical bonding process, a number of C—F bonds are broken to produce free fluorine along with a number of undefined remnants of the original PTFE molecules from which the fluorine and/or remnants were derived. These remnants, other similarly constituted compounds, and other substances which contain or contribute fluorine to the process are referred to by the all-inclusive term, "fluorine containing species," herein.

By this method a number of the tested catalyst candidates appeared to be effective in causing the PTFE and/or other fluorine containing species to bond to the surface of the iron coupon at 0 psia and 100° C., the conditions existent within the sample compartment of the XPS equipment.

Subsequently, tests were conducted wherein the graphite fluoride, halocarbon oil and the catalyst were eliminated from the composition of the mixture into which the coupons were immersed, leaving only one remaining source of fluorine in the mixture, PTFE. Using the same test procedures cited above, very little PTFE and/or fluorine containing species were to be found bonded to the surface of the iron coupon. However, even in the absence of a catalyst candidate minor fluorine peaks were observed, indicating that minor amounts of PTFE and/or fluorine containing species had bonded to the iron coupon surface. It is believed in these instances that the iron of which the coupon was composed, which iron material is one of the transition elements known to exhibit catalytic properties in certain reactions, perhaps performed catalytic functions in these cases. As discussed hereinafter, ferric (iron) fluoride was generally shown to be an effective catalyst in this series of tests, which fact serves to lend additional credence to the above stated belief.

After conducting a number of duplicate tests, and several collateral confirming tests, it was further shown that the family of accumulated test results generally constituted support of the concept that PTFE and/or fluorine containing species could be caused to bond to the surface of the iron coupons at temperatures ranging from 50° C. to 200° C. at atmospheric pressure, and remain bonded to the coupon surface while being tested in the XPS equipment chamber at 100° C. and 0 psia.

In subsequent conventional tribological wear tests, in particular the Ball on Cylinder Test, the Predictive FZG Gear Test, the Predictive Ryder Gear Test, and the Shell Four-Ball Test, the introduction, one at a time, of six of the seven catalysts generally shown to be effective by the XPS test methods cited above, without the inclusion of any other ingredients, generally showed each of these catalysts to be individually very effective in improving the wear resistance of two specific commercial engine treatment lubricant products, Quaker State Slick 50® and Valvoline TM8®, both of which products contained PTFE. Most of these tests were conducted at 87° C. and at atmospheric pressure.

The same conventional tribological wear tests were run on a catalytic lubricant system containing the same ingredients as those displayed in Table 1, but in different concentrations, and ferric fluoride ($FeF_3$) was employed as the catalyst. The results showed this system to exhibit wear resistance, based on the Ball on Cylinder Test results, that were approximately three (3) times as great as the SAE 10W-30, API Service Category SJ, SH motor oil which was the lubricant base of this system.

The laboratory tests designed to establish specifications for the concepts contained in this invention are ongoing and it is expected that eventually an entire catalog of catalysts shall be developed, wherein the efficacy of the many different catalysts of this invention shall be defined with respect to their capability to initiate, to promote, to accelerate, and/or to increase the yield of the reaction products of this invention. The tested catalysts thus far generally shown to effectively promote the bonding reaction between an iron surface and PTFE and/or fluorine containing species, at the test conditions of 100° C. and 0 psia, are shown in Table 2 below:

TABLE 2

Tested Effective Catalysts

| | Symbol | Designation |
|---|---|---|
| 1. | Pt | Platinum |
| 2. | $FeF_3$ | Ferric fluoride |
| 3. | $AlF_3$ | Aluminum trifluoride |
| 4. | $Na_3AlF_6$ | Synthetic cryolite |
| 5. | $ZrF_4$ | Zirconium tetrafluoride |
| 6. | $TiF_3$ | Titanium trifluoride |
| 7. | $TiF_4$ | Titanium tetrafluoride |

The catalysts may be grouped into various categories, such as transition metal-containing catalysts, fluorine-containing catalysts, aluminum-containing catalysts (including alumina), or other groupings. Each of the catalysts listed in Table 2 were tested at a concentration of two weight percent (2%). The optimal and/or minimal catalyst concentrations have not as yet been established. It is preferred that the catalyst is present in an amount sufficient only to act as a catalyst so as to initiate, to promote, to accelerate and/or to increase the yield of the surface coating chemical bonding reaction, with the catalyst remaining unchanged at the completion of the reaction. The specific weight percent concentration for the catalyst depends on the specific catalyst, but it is generally preferred that the weight percent be made as low as possible. For example, the weight percent is preferred to be under about 2%, more preferably under about 1%, even more preferably under 0.5%, and most preferably under about 0.1%.

One of the preferred and perhaps simplest embodiments of this invention is a composition comprising an aqueous carrier fluid, one or more dispersants for the purpose of creating a stable colloidal suspension of the mixture of ingredients, colloidal particles of PTFE as the unreacted surface coating materials, and one or more catalysts.

As used herein, the term "colloidal particles" generally means particles that have diameters ranging from approximately one micrometer to one nanometer. Because of the various forces acting between the particles and the dispersant fortified aqueous carrier fluid in which the particles are suspended, it is expected that the particles shall generally never precipitate or settle out of suspension for all practical purposes, unless subjected to extraordinary circumstances. There are many dispersants known to those skilled in the art, including organic polymers (e.g., polyacrylates, polymaleates, and acrylamide polymers) and condensed phosphates (e.g., polyphosphate salts). The PTFE commonly is reduced to colloidal size by having been subjected to bombardment in air by a strong electron beam or by a gamma ray. The bombardment process reduces the PTFE polymer to shorter chain PTFE molecules, and/or other fluorine containing species, which comprise other chemically active functional groups formed at the points of bond rupture. These active functional groups generally facilitate the establishment of a stable colloidal suspension and aid in the establishment of chemical bonding to the surfaces to be coated.

Preferred Embodiment of Catalyzed Surface Coating Additive

A preferred embodiment of a catalyzed surface coating additive of this invention is as shown in Table 3 below.

TABLE 3

Preferred Embodiment of Catalyzed Surface Coating Additive

| | Ingredients | Weight % |
|---|---|---|
| 1. | Carrier Fluid Water | 74.0 |
| 2. | Dispersant Polymer-Amine | 6.0 |
| 3. | Catalyst Synthetic Cryolite ($Na_3AlF_6$) | 4.0 |
| 4. | Unreacted Surface Coating Materials PTFE Colloidal Particles in a Stable Colloidal System | 4.0 |
| 5. | Halogen Source Stannous Fluoride | 4.0 |
| 6. | Primary Detergent Alkylphenolsalicylate Detergent | 4.0 |
| 7. | Freezing Point and/or Boiling Point Altering Agents Ethyl Alcohol | 4.0 |
| | Total | 100.0 |

Preferred Embodiment of Catalyzed Coating

A preferred embodiment of a catalyzed coating system of this invention is as shown in Table 4 below.

TABLE 4

Preferred Embodiment of Catalyzed Coating System

| | Ingredients | Weight % |
|---|---|---|
| 1. | Catalyzed Surface Coating Additive See formulation above. | 20.0 |
| 2. | Carrier Fluid Water | 80.0 |
| | Total | 100.0 |

The catalyzed surface coating additive may generally be used as an efficient method of transporting and storing a concentrated mixture which is intended to be added to a carrier fluid before application. Once mixed together with a carrier fluid to make the catalyzed surface coating system, the weight percentages of the preferred embodiments illustrated in Tables 3 and 4 would be as shown in Table 5 below.

TABLE 5

Detailed Weight Percentages of Preferred Embodiment Catalyzed Surface Coating System

| | Ingredients | Weight % |
|---|---|---|
| 1. | System Carrier Fluid Water | 80.0 |
| 2. | Additive Carrier Fluid Water | 14.8 |
| 3. | Dispersant Polymer-Amine | 1.2 |
| 4. | Catalyst Synthetic Cryolite ($Na_3AlF_6$) | 0.8 |
| 5. | Unreacted Surface Coating Materials PTFE Colloidal Particles in a Stable Colloidal System | 0.8 |
| 6. | Halogen Source Stannous Fluoride | 0.8 |
| 7. | Primary Detergent Alkylphenolsalicylate Detergent | 0.8 |
| 8. | Freezing Point and/or Boiling Point Altering Agents Ethyl Alcohol | 0.8 |
| | Total | 100.0 |

With respect to the composition of the preferred embodiment catalyzed coating system above, it is believed that the formation of a surface coating on the coated surface involves bonding reactions between the PTFE and/or fluorine containing species and the underlying surface to be coated. The surface coating may comprise one or more of the following characteristics: multilayered, persistent, solid, corrosion resistant, impact resistant, wear resistant, and non-stick (e.g., anti-icing). In such reactions, it is believed that fluoride radicals are progressively delivered to the surface from the PTFE and/or the fluorine containing species, and in turn hydrogen is bonded in part to the former PTFE molecules and/or fluorine containing species, in place of the lost fluorine. Ultimately, where these types of reactions go to completion, the PTFE molecules and/or fluorine containing species may be converted to simple aliphatic hydrocarbon molecules, much like the composition of paraffin base mineral oils. The reactions are promoted by the presence of the catalyst or catalysts; however, any such catalysts are not consumed in the process. By definition, a catalyst is an agent present during a reaction, and an agent that may have a measurable effect on the initiation, the promotion, the rate, and/or the yield of the reaction, but remains unchanged chemically at the conclusion of the reaction.

The halogen source is generally a different material from the catalyst and the unreacted surface coating material, although for some applications it may be the same as either. Halogens are defined as the electronegative elements of Group VIIA of the periodic table and include, in descending order of activity, fluorine, chlorine, bromine, iodine, and astatine. Fluorine is the most active of all chemical elements, and hence is the most active halogen. The halogen source includes halogen elements and halogen element compounds, such as aluminum trifluoride ($AlF_3$), cryolite ($Na_3AlF_6$), metal fluoroborates (e.g., $Fe(BF_4)$), fluorospar ($CaF_2$), fluorapatite ($Ca_5(PO_4)_3F$), metal fluorides (e.g., $FeF_3$, $SnF_2$, $ZnF_2$), organic halogen polymers (e.g., polytetrafluoroethylene, polychlorotrifluoroethylene), halogenated hydrocarbons, other halogenated inorganic compounds, and other halogenated organic compounds.

The catalytically aided chemical bonding reactions discussed above cause an alteration in the chemical composition of the exterior of the coated surfaces, wherein the newly created and exposed surfaces then serve to redefine the performance of such surfaces.

The effectiveness of this invention is expected to be comparatively better than other alternatives in that the catalytic action serves to initiate, to promote, to accelerate the PTFE and/or fluorine containing species bonding reactions, and/or to increase the yield of the bonded PTFE and/or fluorine containing species derived surface coating films. In addition, the rapidly catalyzed, bonded surface coating film formation, and increased production of bonded surface coating film yields, will generally serve to fully coat the surface to which it is applied, and maximize the protection of such surface. In some applications, such as an anti-icing application, the film may diminish the opportunity for adjacent surfaces, which are absent bonded surface coatings (if any exist), to allow adherence of ice. However, it is preferred that when surfaces are maintained and replenished with enduring, continuous, protective, and bonded PTFE and/or fluorine containing species derived surface coating films, there will preferably be few or no uncoated unprotected surfaces. Additionally, it is not generally expected that this invention will reach the state of 100% surface protection for all purposes, but it is generally expected that with the application of this invention the goal of 100% surface protection has the prospect of being more nearly reached than by any other presently known method.

Based on research work conducted by L. L. Cao et al. at the Tribology Research Institute, Tsinghua University, Beijing, China, it was shown that metallic wear surfaces exposed to compressed contact with PTFE under elevated temperature conditions (i.e. 1800° F.), but without the presence of a catalyst or catalysts, resulted in surface film depositions that could be qualitatively divided into four layers, including the outermost layer of PTFE. A lubricating base oil carrier fluid containing PTFE was subjected to friction induced high temperature wear conditions and when the test was completed, the contacting surfaces of the iron (Fe) test specimens were analyzed using X-ray Photoelectron Spectroscopy and a Scanning Auger Microprobe. The chemical state of the fluorine containing species in the reaction films were shown to display four different chemical structures. The chemical structures and the related binding energies were as shown in Table 6 below.

layer was composed of an absorbed film of PTFE. The second layer was composed of a mixed reaction film, including various fluorine containing species, shown as Item 2 in Table 6. The third layer, shown as Item 3 in Table 6, exhibited a chemical structure in which there was a paucity of fluorine with respect to the second layer. The deepest layer, the fourth layer, shown as Item 4 in Table 6, consisted primarily of ferrous and ferric fluoride, along with some microparticles of PTFE.

TABLE 6

Composition of Reaction Products After L.L. Cao et al.

| | Description | Chemical Structure | Designation | Binding Energy, eV |
|---|---|---|---|---|
| 1. | Outermost Layer | (—$CF_2$—$CF_2$—) | Polytetrafluoroethylene | 689.72 |
| 2. | Second Layer In | (—CFH—CFH—) | Polydifluoroethylene | 688.50 |
| 3. | Third Layer In | (—CFH—$CH_2$—) | Polymonofluoroethene | 687.45 |
| 4. | Metal Surface | $FeF_{x(x=2\&3)}$ | Ferrous & Ferric Fluoride | 684.42 |

It was generally established that multilayered surface reaction films, with the structural layers set forth in Table 6, were formed on the metallic surface. The outermost or first The progression of chemical reactions postulated to develop the final four layers diagnosed by L. L. Cao et al., would be as follows:

---

1. Outermost Layer.

1.1 Absorption of Polytetrafluoroethylene:
       (—$CF_2$—$CF_2$—)
       PTFE

2. Second Layer In.

2.1 Dehydrogenation of Base Oil:
       $C_{10}H_{22}$ ←catalyst→ $C_{10}H_{20}$ + 2H
       n-decane                n-decene   hydrogen
   2.2 Severance of Fluorine-Carbon Bonds and First Stage Hydrogenation of PTFE:
       (—$CF_2$—$CF_2$—) + 2H ←catalyst→ (—CFH—CFH—) + 2F
       PTFE                hydrogen                 polydifluoroethylene   fluorine 3. Third Layer In.

3.1 Dehydrogenation of Base Oil:
       $C_{10}H_{22}$ ←catalyst→ $C_{10}H_{20}$ + 2H
       n-decane                n-decene   hydrogen
   3.2 Added Severance of Fluorine-Carbon Bonds and Second Stage Hydrogenation of PTFE:
       (—CFH—CFH—) + H ←catalyst→ (—CFH—$CH_2$—) + F
       polydifluoroethylene   hydrogen                polymonofluoroethylene   fluorine 4. Metal Surface.

4.1 Polymonofluoroethylene Bonding Reaction with Iron and Fluorine:
       2Fe + 4F + (—CFH—$CH_2$—) ←catalyst→ $FeF_2$(—CFH—$CH_2$—)$FeF_2$*
       iron    fluorine polymono-                       ferric fluoride-polymono-
                 fluoroethylene                                fluoroethylene bonded
   4.2 Fluorine Reaction with Ferrous Iron:
       Fe + 2F ←catalyst→ FeF2
       iron    fluorine           ferrous fluoride
   4.3 Fluorine Reaction with Ferrous Fluoride:
       $FeF_2$ + F ←catalyst→ $FeF_3$
       ferrous fluoride   fluorine          ferric fluoride

*In the "Metal Surface" reaction, 4.1 above, the reaction products could be as shown, or could be one or a combination of reaction products (fluorine containing species) selected from a group consisting of the following:
   4.1.1 Fe(—$CF_2$—$CF_2$—)$_2$,
   4.1.2 Fe(—$CF_2$—CFH—)$_2$,
   4.1.3 Fe(—CFH—CFH—)$_2$,
   4.1.4 Fe(=CF—CFH—),
   4.1.5 Fe(=CF—CF=),
   4.1.6 FeF(—$CF_2$—$CF_2$—), -continued 4.1.7 FeF(—CFH—CH$_2$—),
4.1.8 Fe(—CF$_2$—CF$_2$—)$_3$,
4.1.9 Fe(—CF$_2$—CFH—)$_3$,
4.1.10 Fe(—CFH—CFH—)$_3$,
4.1.11 2Fe(=CF—CFH—)$_3$,
4.1.12 2Fe(=CF—CF=)$_3$, and
4.1.13 FeF$_2$(—CF$_2$—CF$_2$—).

Whereas L. L. Cao et al. disclosed results wherein they dealt with a carrier fluid composed of hydrocarbon oil and a surface to be coated or substrate of iron (Fe), it is believed that essentially the same series of postulated chemical reactions would theoretically apply for other carrier fluids, such as an aqueous composition. The carrier fluid of the present invention is preferably liquid, but may also be a gas. For example, a refrigerant, such as a CFC or a more environmentally safe alternative, is liquid under pressure, but a liquid that changes to a gas at ambient conditions. Such a carrier fluid could be used to transport the other ingredients to a surface as a gaseous carrier fluid, leaving the other ingredients on the surface. Also, it is believed that the reaction products would be analogous, if, rather than iron (Fe), the substrate were alloys of iron, aluminum, magnesium, plastics, carbon fiber, glass fiber, resin/fiber composites, natural fibers, or other materials commonly employed in the fabrication of articles of manufacture, which may benefit from the protection of a surface coating such as those catalyzed surface coatings of this invention.

Also, in view of the fact that fluorine is the most electronegative element and the most reactive nonmetal known, it is postulated that it will react with virtually any material of which the surface to be coated may be constructed. Furthermore, it is anticipated that the progression of the in situ chemical reactions, postulated for the case wherein the coated surface was constructed of iron, would be essentially the same except that the chemical symbol for the material of the alternate surfaces to be coated may be different. In the event such surface material was other than iron, the chemical symbol for iron (Fe) would be replaced by the chemical symbol for the alternate surface material, and the combining ratios would be appropriately adjusted.

The presence of the catalyst, such as the synthetic cryolite in a preferred embodiment of this invention, serves to initiate the reactions, to promote the reactions, to accelerate the reactions, and/or to cause the reactions to exhibit a greater yield, and to allow the reactions to go to completion more rapidly under ambient conditions. As used herein with respect to the catalytic chemical bonding reaction, the generic term "promote" means one or more of the actions described above, i.e., initiate, promote, accelerate, cause to exhibit a greater yield, and allow to go to completion more rapidly. Any non-liquid or non-gaseous ingredients in the composition are preferably of colloidal size.

As used herein with respect to a group of two or more terms (e.g., a list of materials or processes), the phrases "and", "or", and "and/or" are generally intended to indicate any one of the terms or combinations of any of the terms. As used herein with respect to a group of materials, the phrase "any number" is intended to include the number 0 or greater.

Although this invention has been described in conjunction with a specific embodiment, it is evident that many alternatives, modifications, variations, and permutations will be apparent to those skilled in the relevant arts, in light of the foregone descriptions and discussions. Other embodiments will become apparent to those skilled in the relevant arts from a consideration of the concept, scope, spirit, specifications, and practices of this invention. It is contended that the alternatives, modifications, variations, and permutations in the embodiment and methods of this invention may be practiced, without departing from the concept, scope or spirit of this invention disclosed herein. Accordingly, it is contended that this invention is not confined to the particular embodiments, formulations, reactions, and methods presented herein, but rather such alternatives, modifications, variations, and permutations can be made herein without departing from the spirit and scope of the invention as defined by the Claims presented hereinafter.

What is claimed is:

1. A method of catalytically chemically altering the exterior surface of an aircraft by bonding a film of anti-icing material to the exterior surface, said method comprising:
    bringing a catalyzed composition of ingredients into contact with said exterior surface of said aircraft, said composition comprising at least one carrier fluid, at least one dispersant, at least one unreacted material as a source for said film of material, and at least one catalyst, wherein said at least one catalyst promotes said catalytic chemical bonding between said at least one unreacted material and said exterior surface of said aircraft;
    wherein ice may be removed from ice-bearing exterior surfaces of said aircraft at least through physical displacement of said ice.

2. The method of claim 1, wherein said film of anti-icing material is PTFE.

3. The method of claim 1, wherein said anti-icing material is selected from the group consisting of PTFE, polytetrafluoroethylene, polychlorotrifluoroethylene, perfluoropolyether, polyvinylidene fluoride, perfluoropolyether oxide, barium fluoride, calcium fluoride, and lithium fluoride.

4. The method of claim 1, wherein said catalyzed composition of ingredients comprises at least one transition element.

5. The method of claim 4, wherein said at least one transition element is selected from the group consisting of: scandium, titanium, vanadium, chromium, manganese, iron, cobalt, nickel, copper, zinc, gallium, yttrium zirconium, niobium, molybdenum, technetium, ruthenium, rhodium, palladium, silver, cadmium, indium, lutetium, hafnium, tantalum, tungsten, rhenium, osmium, iridium, platinum, gold, mercury, thallium, and combinations thereof.

6. The method of claim 1, wherein said catalyzed composition of ingredients comprises at least one transition element-containing compound.

7. The method of claim 4, wherein said at least one catalyst comprises at least one fluorine-containing compound.

8. The method of claim 7, wherein said at least one fluorine-containing compound is cryolite (Na$_3$AlF$_6$).

9. The method of claim 7, wherein said at least one fluorine-containing compound is selected from the group consisting of:

ferric fluoride (FeF$_3$);
aluminum trifluoride (AlF$_3$);
cryolite (Na$_3$AlF$_6$);
zirconium tetrafluoride (ZrF$_4$);
titanium trifluoride (TiF$_3$);
titanium tetrafluoride (TiF$_4$);
and combinations thereof.

10. The method of claim 1, wherein said catalyzed composition of ingredients comprises at least one aluminum-containing compound.

11. The method of claim 10, wherein said at least one aluminum-containing compound is selected from the group consisting of alumina, cryolite, aluminum trifluoride, and combinations thereof.

12. The method of claim 1 wherein ice may be removed by focusing turbine gases of at least one of the aircraft's engines or an auxiliary power unit on said ice-bearing surfaces to physically displace and melt said ice.

13. The method of claim 1 wherein said catalyzed composition of ingredients is environmentally benign.

14. A method of catalytically chemically altering the exterior surface of a vehicle by bonding a film of material to the exterior surface, said method comprising:
    bringing a catalyzed composition of ingredients into contact with said exterior surface of said vehicle, said composition comprising at least one carrier fluid, at least one dispersant, at least one unreacted material as a source for said film of material, and at least one catalyst, wherein said at least one catalyst promotes said catalytic chemical bonding between said at least one unreacted material and said exterior surface of said vehicle.

15. The method of claim 14, further comprising admixing said catalyzed composition with at least one carrier fluid to create a catalyzed surface coating system, before said bringing said composition into contact with said exterior surface of said vehicle.

16. The method of claim 14, wherein said at least one unreacted material is selected from the group consisting of PTFE, polytetrafluoroethylene, polychlorotrifluoroethylene, perfluoropolyether, polyvinylidene fluoride, perfluoropolyether oxide, graphite, barium fluoride, calcium fluoride, and lithium fluoride.

17. The method of claim 14, wherein said at least one carrier fluid surrounds and contains the other ingredients of said composition until the other ingredients are delivered to the surface to be coated.

18. The method of claim 14, wherein said at least one dispersant maintains the ingredients of said composition in a stable colloidal state, and wherein said dispersant is chemically compatible with the ingredients of said composition.

19. The method of claim 18, wherein said at least one dispersant is a polymer-amine.

20. The method of claim 14, wherein said at least one catalyst comprises at least one transition element.

21. The method of claim 20, wherein said at least one transition element is selected from the group consisting of: scandium, titanium, vanadium, chromium, manganese, iron, cobalt, nickel, copper, zinc, gallium, yttrium zirconium, niobium, molybdenum, technetium, ruthenium, rhodium, palladium, silver, cadmium, indium, lutetium, hafnium, tantalum, tungsten, rhenium, osmium, iridium, platinum, gold, mercury, thallium and combinations thereof.

22. The method of claim 14, wherein said at least one catalyst comprises at least one fluorine-containing compound.

23. The method of claim 22, wherein said at least one fluorine-containing compound is selected from the group consisting of:
    ferric fluoride (FeF$_3$);
    aluminum trifluoride (AlF3);
    cryolite (Na$_3$AlF$_6$);
    zirconium tetrafluoride (ZrF$_4$);
    titanium trifluoride (TiF$_3$);
    titanium tetrafluoride (TiF$_4$);
and combinations thereof.

24. The method of claim 14, wherein said at least one catalyst comprises at least one aluminum-containing compound.

25. The method of claim 24, wherein said at least one aluminum-containing compound is selected from the group consisting of:
    alumina, cryolite;
    aluminum trifluoride;
and combinations thereof.

26. The method of claim 14, wherein said at least one catalyst is homogeneous, heterogeneous or a combination of homogeneous and heterogeneous.

27. The method of claim 14, wherein said additive composition further comprises at least one halogen source.

28. The method of claim 27, wherein said at least one halogen source is selected from the group consisting of:
    aluminum trifluoride (AlF$_3$);
    cryolite (Na$_3$AlF$_6$);
    metal fluoroborates, fluorospar (CaF$_2$);
    fluorapatite (Ca$_5$(PO$_4$)$_3$F);
    metal fluorides;
    organic halogen polymers;
    halogenated hydrocarbons;
and combinations thereof.

29. The method of claim 14, where said additive composition further comprises at least one detergent.

30. The method of claim 29, wherein said at least one detergent is alkylphenolsalicylate detergent.

31. The method of claim 14, wherein said additive composition further comprises at least one freezing point or boiling point altering agent.

32. The method of claim 31, wherein said at least one freezing point or boiling point altering agent is ethyl alcohol.

33. The method of claim 14 wherein said additive composition further comprises:
    stannous fluoride;
    alkylphenolsalicylate detergent; and
    ethyl alcohol.

34. The method of claim 14, wherein all solid ingredients are of colloidal size.

35. The method of claim 14, wherein the composition is environmentally benign.

36. The method of claim 14, wherein said catalyzed composition is brought into contact and allowed to react with said exterior surface of said vehicle until catalyzed chemical bonding reactions generally go to completion under ambient temperature and pressure conditions.

37. The method of claim 14 further comprising:
    cleaning said exterior surface of said vehicle before said catalyzed composition is brought into contact with said exterior surface of said vehicle.

38. The method of claim 14, where in said catalyzed composition is brought into contact with said exterior surface of said vehicle by a process selected from the group consisting of:

spray coating,
immersion,
brushing,
wiping,
mechanical transference,
and combinations thereof.

39. The method of claim 14 further comprising:
removing any unbonded ingredients of said catalyzed composition from said exterior surface of said vehicle after said composition is brought into contact with said surface.

40. The method of claim 14 further comprising:
altering the exterior surface of said vehicle by bonding said film of material to said exterior surface while said exterior surface is mounted to said vehicle.

41. The method of claim 14 further comprising:
altering the exterior surface of said vehicle by bonding said film of material to said exterior surface before said exterior surface is mounted to said vehicle.

42. The method of claim 14, wherein said vehicle is an aircraft.

43. The method of claim 14, wherein said vehicle is a ship.

44. The method of claim 14, wherein said vehicle is an automobile.

45. A composition for catalytically chemically altering the chemical composition of the exterior surface of a vehicle so as to provide anti-icing properties by bonding a film of material to the exterior surface, comprising:
at least one carrier fluid;
at least one dispersant;
at least one unreacted material as a source for said film of material;
at least one catalyst, wherein said at least one catalyst promotes catalytic chemical bonding between said at least one unreacted material and said exterior surface of said vehicle;
a halogen source;
a detergent; and
a freezing point or boiling point altering agent.

46. The composition of claim 45, wherein said catalyst is cryolite ($Na_3AlF_6$).

47. The composition of claim 45, wherein said unreacted material is PTFE.

48. The composition of claim 45, wherein said halogen source is stannous fluoride.

49. The composition of claim 45, wherein said detergent is alkylphenolsalicylate.

50. The composition of claim 45, wherein said freezing point or boiling point altering agent is ethyl alcohol.

51. An icing-resistant external surface for an aircraft, comprising:
a surface material treated with a catalyzed composition, wherein the catalyzed composition comprises:
at least one carrier fluid, at least one dispersant, at least one unreacted material as a source for said film of material, and at least one catalyst, wherein said at least one catalyst promotes said catalytic chemical bonding between said at least one unreacted material and said exterior surface of said vehicle.

52. The icing-resistant external surface of claim 51, wherein said at least one unreacted material is selected from the group consisting of PTFE, polytetrafluoroethylene, polychlorotrifluoroethylene, perfluoropolyether, polyvinylidene fluoride, perfluoropolyether oxide, ethylene polymers, propylene polymers, fluorophenylene polymers, polymers, fluorinated inorganic and organic compounds, fluorine containing species, plastics, ethers, amides of fatty acids, monoesters of fatty acids, fatty acid compounds, metallic soaps, polyol molybdenum compounds, graphite, carbon halogens, barium fluoride, calcium fluoride, lithium fluoride, sulfurized fats, esters, and combinations thereof.

53. The icing-resistant external surface of claim 51, wherein said catalyzed composition further comprises pigmentation.

54. The icing-resistant external surface of claim 51, wherein said at least one dispersant maintains the ingredients of said composition in a stable colloidal state, and wherein said dispersant is chemically compatible with the other ingredients of said composition.

55. The icing-resistant external surface of claim 51, wherein said at least one dispersant is a polymer-amine.

56. The icing-resistant external surface of claim 51, wherein said at least one catalyst comprises at least one transition element.

57. The icing-resistant external surface of claim 56, wherein said at least one transition element is selected from the group consisting of: scandium, titanium, vanadium, chromium, manganese, iron, cobalt, nickel, copper, zinc, gallium, yttrium zirconium, niobium, molybdenum, technetium, ruthenium, rhodium, palladium, silver, cadmium, indium, lutetium, hafnium, tantalum, tungsten, rhenium, osmium, iridium, platinum, gold, mercury, thallium, and combinations thereof.

58. The icing-resistant external surface of claim 51, wherein said at least one catalyst comprises at least one transition element-containing compound.

59. The icing-resistant external surface of claim 51, wherein said at least one catalyst comprises at least one fluorine-containing compound.

60. The icing-resistant external surface of claim 59, wherein said at least one fluorine-containing compound is cryolite ($Na_3AlF_6$).

61. The icing-resistant external surface of claim 59, wherein said at least one fluorine-containing compound is selected from the group consisting of:
ferric fluoride ($FeF_3$);
aluminum trifluoride ($AlF_3$);
cryolite ($Na_3AlF_6$);
zirconium tetrafluoride ($ZrF_4$);
titanium trifluoride ($TiF_3$);
titanium tetrafluoride ($TiF_4$);
and combinations thereof.

62. The icing-resistant external surface of claim 51, wherein said at least one catalyst comprises at least one aluminum-containing compound.

63. The icing-resistant external surface of claim 62, wherein said at least one aluminum-containing compound is selected from the group consisting of:
alumina;
cryolite;
aluminum trifluoride;
and combinations thereof.

64. The icing-resistant external surface of claim 51, further comprising at least one halogen source.

65. The icing-resistant external surface of claim 64, wherein said at least one halogen source is selected from the group consisting of:

aluminum trifluoride (AlF$_3$);
cryolite (Na$_3$AlF$_6$);
metal fluoroborates;
fluorospar (CaF$_2$);
fluorapatite (C$_5$(PO$_4$)$_3$F);
metal fluorides;
organic halogen polymers;
halogenated hydrocarbons;
and combinations thereof.

66. The icing-resistant external surface of claim 51, wherein said catalyzed composition further comprises at least one detergent.

67. The icing-resistant external surface of claim 66, wherein said at least one detergent is alkylphenolsalicylate detergent.

68. The icing-resistant external surface of claim 51, wherein said catalyzed composition further comprises at least one freezing point or boiling point altering agent.

69. The icing-resistant external surface of claim 68, wherein said at least one freezing point or boiling point altering agent is ethyl alcohol.

70. The icing-resistant external surface of claim 51, wherein all solid ingredients of said catalyzed composition are of colloidal size.

71. The icing-resistant external surface of claim 51, wherein the catalyzed composition is environmentally benign.

72. A icing-resistant material comprising:

a substrate material useable as an external surface of an aircraft, said substrate material having an outer surface that has been altered by a catalytic compound, wherein said outer surface comprises an icing-resistant compound that has been chemically bonded to said substrate material at or near ambient temperatures.

73. The method of claim 1, wherein said at least one unreacted surface coating material is selected from the group consisting of halogenated compounds, polymers, esters, amides, fatty acids, metallic soaps, molybdenum compounds, graphite compounds, and sulfur compounds.

74. The method of claim 14, wherein said at least one unreacted surface coating material is selected from the group consisting of halogenated compounds, polymers, esters, amides, fatty acids, metallic soaps, molybdenum compounds, graphite compounds, and sulfur compounds.

* * * * *